United States Patent
Sarkar et al.

(10) Patent No.: US 8,560,233 B2
(45) Date of Patent: Oct. 15, 2013

(54) METHOD OF DETERMINING A GPS POSITION FIX AND A GPS RECEIVER FOR THE SAME

(75) Inventors: Amites Sarkar, Crawley (GB); Andrew T. Yule, East Grinstead (GB)

(73) Assignee: NXP B.V., Eindhoven (NL)

(*) Notice: Subject to any disclaimer, the term of this patent is extended or adjusted under 35 U.S.C. 154(b) by 2290 days.

(21) Appl. No.: 10/555,391

(22) PCT Filed: Apr. 28, 2004

(86) PCT No.: PCT/IB2004/001419
§ 371 (c)(1),
(2), (4) Date: Nov. 2, 2005

(87) PCT Pub. No.: WO2004/099813
PCT Pub. Date: Nov. 18, 2004

(65) Prior Publication Data
US 2006/0224317 A1    Oct. 5, 2006

(30) Foreign Application Priority Data
May 7, 2003    (GB) ................................. 0310410.6

(51) Int. Cl.
*G01C 21/00* (2006.01)
*G01C 21/28* (2006.01)

(52) U.S. Cl.
USPC ........... 701/469; 701/449; 701/468; 701/473; 701/476; 701/495; 701/501; 701/534; 701/535

(58) Field of Classification Search
USPC ................. 701/214; 342/357.02, 357.09, 358
See application file for complete search history.

(56) References Cited

U.S. PATENT DOCUMENTS

| | | | |
|---|---|---|---|
| 4,445,118 A * | 4/1984 | Taylor et al. | 342/357.09 |
| 5,323,322 A | 6/1994 | Mueller et al. | |
| 5,731,787 A | 3/1998 | Sheynblat | |
| 6,191,731 B1 * | 2/2001 | McBurney et al. | 342/357.05 |
| 6,211,819 B1 | 4/2001 | King et al. | |
| 6,285,315 B1 | 9/2001 | Pratt | |
| 6,411,892 B1 | 6/2002 | van Diggelen | |
| 6,525,688 B2 * | 2/2003 | Chou et al. | 342/357.06 |
| 6,542,820 B2 * | 4/2003 | LaMance et al. | 701/213 |
| 6,608,998 B1 | 8/2003 | Neumann et al. | |
| 6,650,288 B1 * | 11/2003 | Pitt et al. | 342/357.15 |
| 6,683,564 B1 * | 1/2004 | McBurney | 342/357.02 |
| 6,701,253 B2 | 3/2004 | Edwards et al. | |
| 2002/0065587 A1 | 5/2002 | Syrjärinne et al. | |
| 2002/0175856 A1 * | 11/2002 | Diggelen | 342/357.09 |
| 2006/0224317 A1 * | 10/2006 | Sarkar | 701/213 |
| 2008/0036651 A1 * | 2/2008 | van Diggelen et al. | 342/357.02 |

FOREIGN PATENT DOCUMENTS

| | | |
|---|---|---|
| EP | 1 336 866 A2 | 8/2003 |
| JP | 6-034740 A | 2/1994 |
| JP | 2002-221565 A | 8/2002 |
| WO | 98/09181 A1 | 3/1998 |
| WO | 02/099454 A2 | 12/2002 |

\* cited by examiner

*Primary Examiner* — Bhavesh V Amin

(57) ABSTRACT

A method of determining a GPS position fix is disclosed together with a corresponding GPS receiver and server for the same. The method comprising the steps of: (i) providing standard GPS ephemeris corresponding to that transmitted by a GPS satellite; (ii) providing supplemental GPS ephemeris including at least one parameter describing the fluctuation over time of at least one satellite orbit parameter of standard GPS ephemeris; (iii) measuring psuedoranges to GPS satellites; and (iv) determining a GPS position fix from both the standard and supplemental GPS ephemeris provided in steps (i) and (ii) respectively and the psuedoranges measured in step (iii).

17 Claims, 3 Drawing Sheets

METHOD OF DETERMINING A GPS POSITION FIX AND A GPS RECEIVER FOR THE SAME

This invention relates to a method of determining a GPS position fix and a GPS receiver for the same.

PCT patent application, publication number WO02/099454A2 concerns a method and apparatus for generating and distributing satellite tracking information. In particular, the section entitled "Description of the Related Art" of that patent acknowledges the difficulty that a NAVSTAR GPS receiver experiences in downloading ephemeris (satellite orbit and clock data) from a GPS satellite in low signal strength conditions; and also the assisted GPS (AGPS) solution to this problem in which ephemeris data in GPS signals is received by a GPS receiver at a reference station and transmitted onwards to a remote GPS receiver which uses this ephemeris instead of that transmitted directly from GPS satellites to obtain a position fix. WO02/099454A2 indicates that since the source of AGPS ephemeris is ultimately the GPS satellites, the ephemeris remains valid for only a few hours (because of the simplified satellite orbit model described by standard NAVSTAR GPS ephemeris). As such, AGPS necessitates the remote GPS receiver connecting to a source of ephemeris information either periodically or each time a position fix is desired to ensure it is in possession of up to date ephemeris. Without up to date ephemeris, a remote GPS receiver will not be able to accurately determine its position.

The invention of WO02/099454A2 as claimed in claim 1 of that patent describes a method in which long term satellite tracking data (data for a long term ephemeris model) is generated from standard ephemeris data received at a GPS receiving station. This long term satellite tracking data is subsequently transmitted to a remote GPS receiver which may then operate for days without receiving an update of the broadcast ephemeris information. Specifically, it appears that the generation of long term satellite tracking data is done by fitting parameters for a long term ephemeris model to a recent history of standard ephemeris wherein the model not only corresponds with the ephemeris history but also future ephemeris, beyond the 2 hour period in which the standard ephemeris parameters broadcast by the GPS satellites are valid. WO02/099454A2 suggests fitting the long term ephemeris model parameters to a recent history of standard ephemeris using an iterative, least squares type approach which is computationally expensive. Furthermore, standards algorithms for obtaining GPS position fixes from standard ephemeris model parameters can not be used, rather, a more complex algorithm for obtaining a GPS position fix from long term ephemeris models is needed.

It is an object of the present invention to provide an alternative, improved method of determining a GPS position fix without the GPS receiver constantly having to receive updated ephemeris.

In accordance with the present invention, such a method is provided comprising the steps of: (i) providing standard GPS ephemeris corresponding to that transmitted by a GPS satellite; (ii) providing supplemental GPS ephemeris including at least one parameter describing the fluctuation over time of at least one satellite orbit parameter of standard GPS ephemeris; (iii) measuring psuedoranges to GPS satellites; and (iv) determining a GPS position fix from both the standard and supplemental GPS ephemeris provided in steps (i) and (ii) respectively and the psuedoranges measured in step (iii).

The supplemental GPS ephemeris may include at least one parameter describing a frequency component of the fluctuation over time of at least one satellite orbit parameter of standard GPS ephemeris, for example, that corresponding to either a lunar cycle or a solar cycle.

Further provided in accordance with the present invention is a corresponding GPS receiver as claimed in any of claims 5 to 9; and a corresponding server as claimed in any of claims 10 to 13.

The inventors have realised that satellite orbit parameters of standard ephemeris vary predictably with time to the extent that this variation can be modelled whereby errors in standard ephemeris over time can be corrected prior to the determination of a position fix. Hence, the present invention provides a computationally inexpensive solution to providing method of determining a GPS position fix without the GPS receiver constantly having to receive updated ephemeris. This enables not only an enhanced server based A-GPS solution compared to that disclosed in WO02/099454A2 to be provided but also a GPS receiver which itself is able to determine at least one parameter of the supplemental GPS ephemeris from a history of standard GPS ephemeris received directly from the GPS satellites by that GPS receiver.

The present invention is hereafter illustrated, by way of example only, with reference to the accompanying schematic drawings in which.

Figure 1:
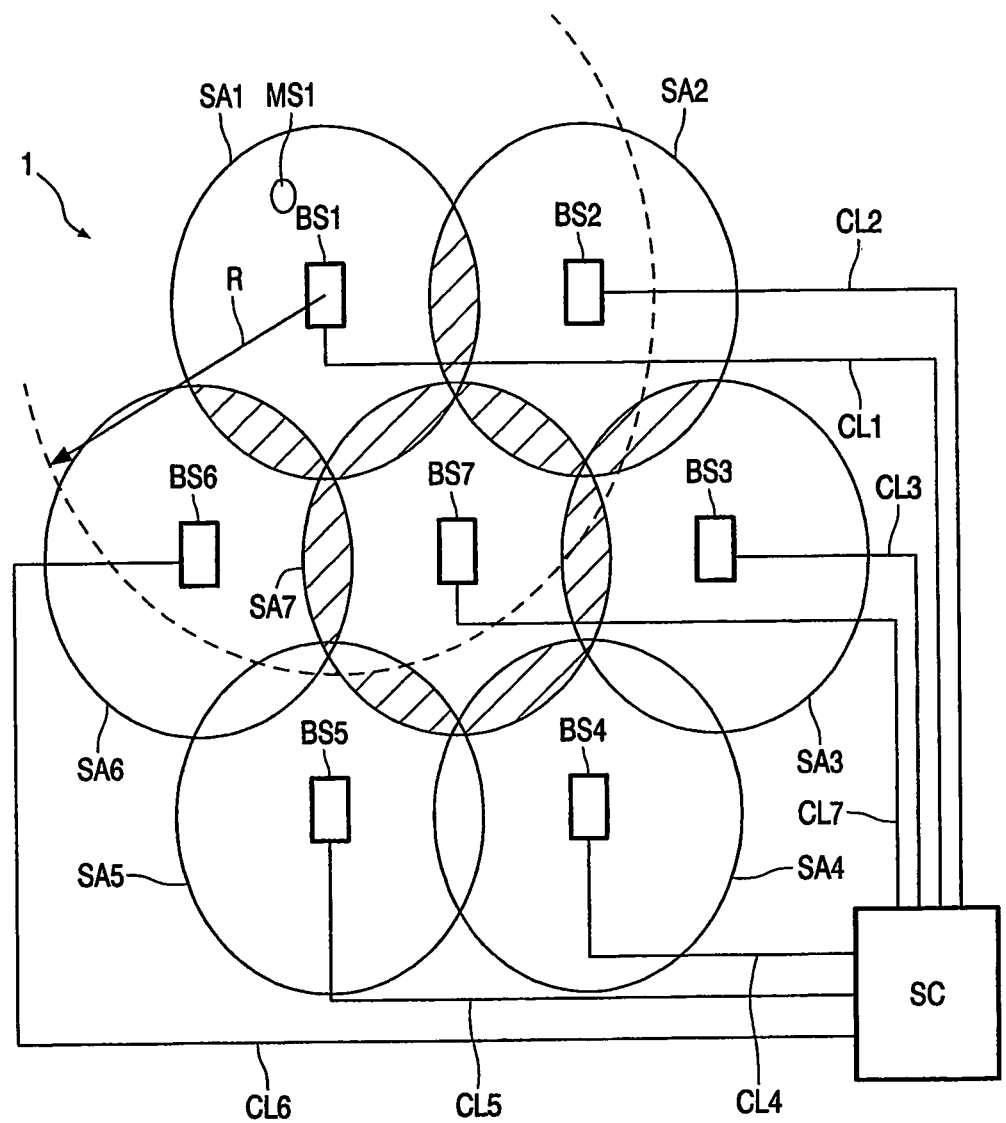
FIG. 1 shows the geographic layout of a cellular telephone network in which is located mobile cellular telephone MS1 which comprises a GPS receiver operating in accordance with the present invention.

The geographical layout of a conventional cellular telephone network 1 is shown schematically in FIG. 1. The network comprises a plurality of base stations BS of which seven, BS1 to BS7, are shown, situated at respective, mutually spaced geographic locations. Each of these base stations comprises the entirety of a radio transmitter and receiver operated by a trunking system controller at any one site or service area. The respective service areas SA1 to SA7 of these base stations overlap, as shown by the cross hatching, to collectively cover the whole region shown. The system may furthermore comprise a system controller SC provided with a two-way communication link, CL1 to CL7 respectively, to each base station BS1 to BS7. Each of these communication links may be, for example, a dedicated land-line. The system controller SC may, furthermore, be connected to a the public switched telephone network (PSTN) to enable communication to take place between a mobile cellular telephone MS1 and a subscriber to that network.

Figure 2:
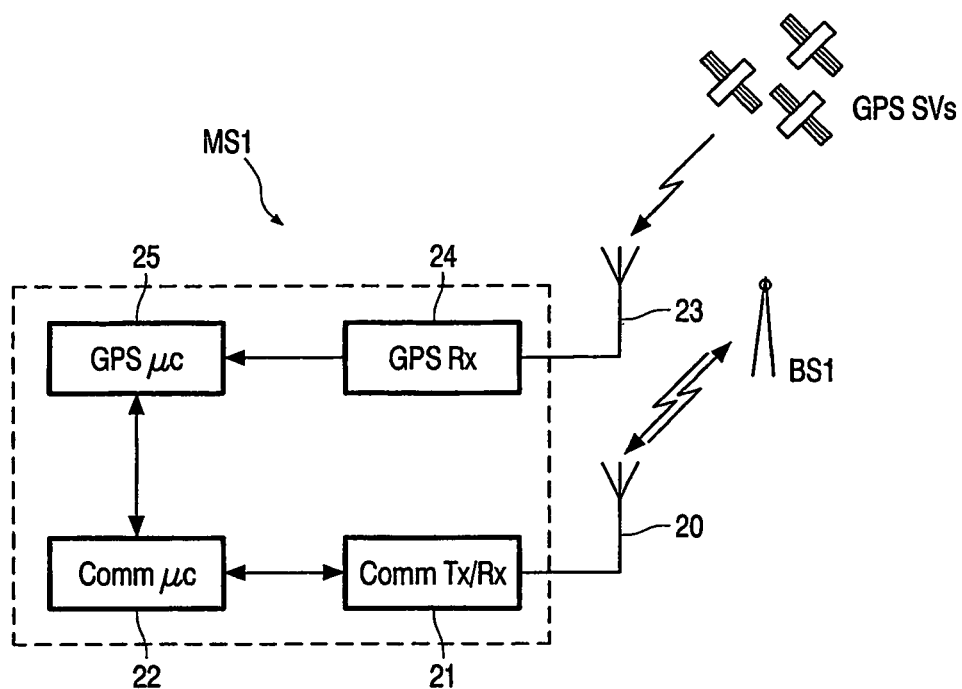
FIG. 2 shows mobile cellular telephone MS1 in greater detail.

Referring to FIG. 2, mobile cellular telephone MS1 is shown in greater detail comprising a communications transmitter (Comm Tx) and receiver (Comm Rx) 21 connected to a communications antenna 20 and controlled by a communications microprocessor (Comm µc) 22 for communication with the base station BS1 with which it is registered. The design and manufacturing of such telephones for two-way communication within a cellular telephone network are well known, those parts which do not form part of the present invention will not be elaborated upon here further.

In addition to the conventional components of a mobile telephone, telephone MS1 further comprises a GPS receiver (GPS Rx) 24 connected to a GPS antenna 23 and controlled by a GPS microprocessor (GPS µc) 25 receiving GPS spread spectrum signals transmitted from orbiting GPS satellites. When operative, the GPS receiver 24 may receive NAVSTAR SPS GPS signal through an antenna 23 and pre-process them, typically by passive bandpass filtering in order to minimise out-of-band RF interference, preamplification, down conversion to an intermediate frequency (IF) and analog to digital conversion. The resultant, digitised IF signal remains modulated, still containing all the information from the available satellites, and is fed into a memory of the GPS microprocessor 25. The GPS signals may then be are acquired and tracked for the purpose of deriving pseudorange information from which the position of the mobile telephone can be determined using conventional navigation algorithms. Such methods for GPS signal acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006-793-7 Artech House. The GPS microprocessor 25 may be implemented in the form a general purpose microprocessor, optionally common with the communications microprocessor 22, or a microprocessor embedded in a GPS application specific integrated circuit (ASIC).

Figure 3:
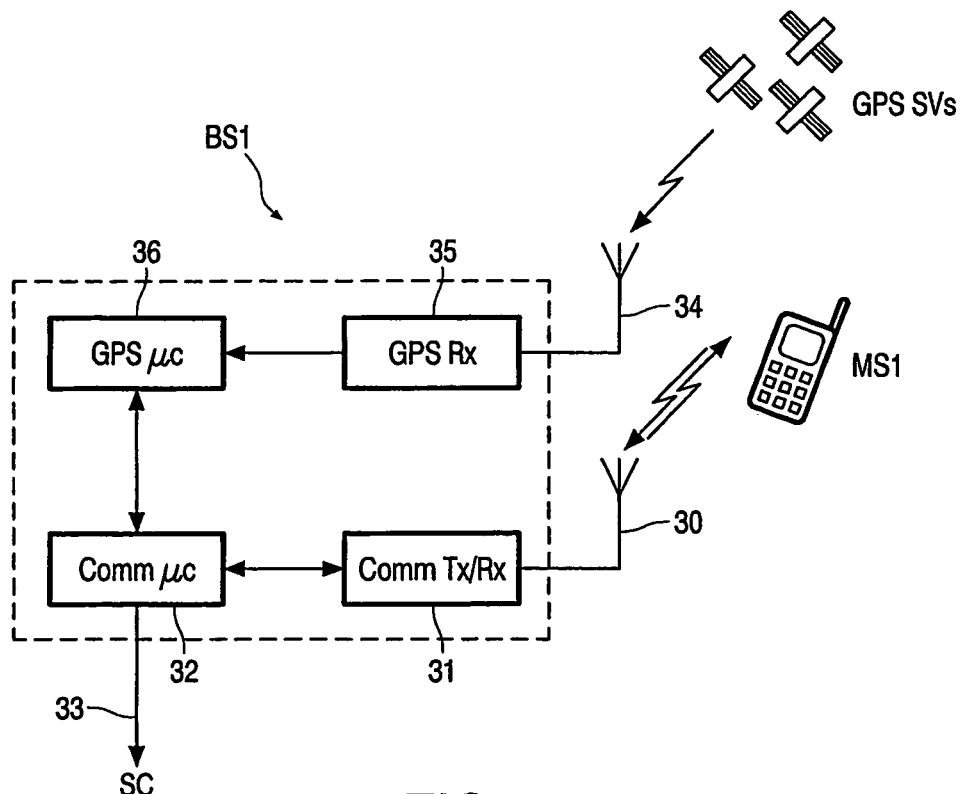
FIG. 3 shows base station BS1 in greater detail.

Cellular telephone network base station BS1 is shown schematically in FIG. 3. In additional to the conventional components of a base station, it further comprises a GPS antenna 34, receiver 35 and microprocessor 36 which are in substantially continual operation whereby the base station is in constant possession of up to date GPS satellite information. This information includes which of the orbiting satellites are presently in view (such satellites are likely to be common to both telephone and associated base station for even macro-cells, obscuration aside); the GPS data message containing an up to date almanac and ephemeris data, and the Doppler shift and current code phase of the GPS satellites signals as observed by the base station.

Upon request, cellular telephone network base station BS1 (acting as a server) provides mobile cellular telephone MS1 with up to date almanac and ephemeris data, and the Doppler shift and current code phase of the GPS satellites signals as observed by the base station. In addition and in accordance with the present invention, cellular telephone network base station BS1 further provides mobile cellular telephone MS1 with supplemental ephemeris data that it has determined and which describes the variation of the 15 standard ephemeris parameters relating to satellite orbit over time such that the standard ephemeris parameters can be corrected beyond the 2 hour period in which the standard ephemeris parameters are normally be considered valid.

Standard NAVSTAR GPS ephemeris contains the following 15 basic orbit parameters that vary over time: (1) square root of semi-major axis, (2) eccentricity, (3) amplitude of sine harmonic correction term to the orbit radius, (4) amplitude of cosine harmonic correction term to the orbit radius, (5) mean motion difference from computed value, (6) mean anomaly at reference time, (7) amplitude of cosine harmonic correction term to the argument of latitude, (8) amplitude of sine harmonic correction term to the argument of latitude, (9) amplitude of cosine harmonic correction term to the angle of inclination, (10) amplitude of sine harmonic correction term to the angle of inclination, (11) longitude of ascending node of orbit plane at weekly epoch, (12) inclination angle at reference time, (13) rate of inclination angle, (14) argument of perigee and (15) rate of right ascension.

Figure 4:
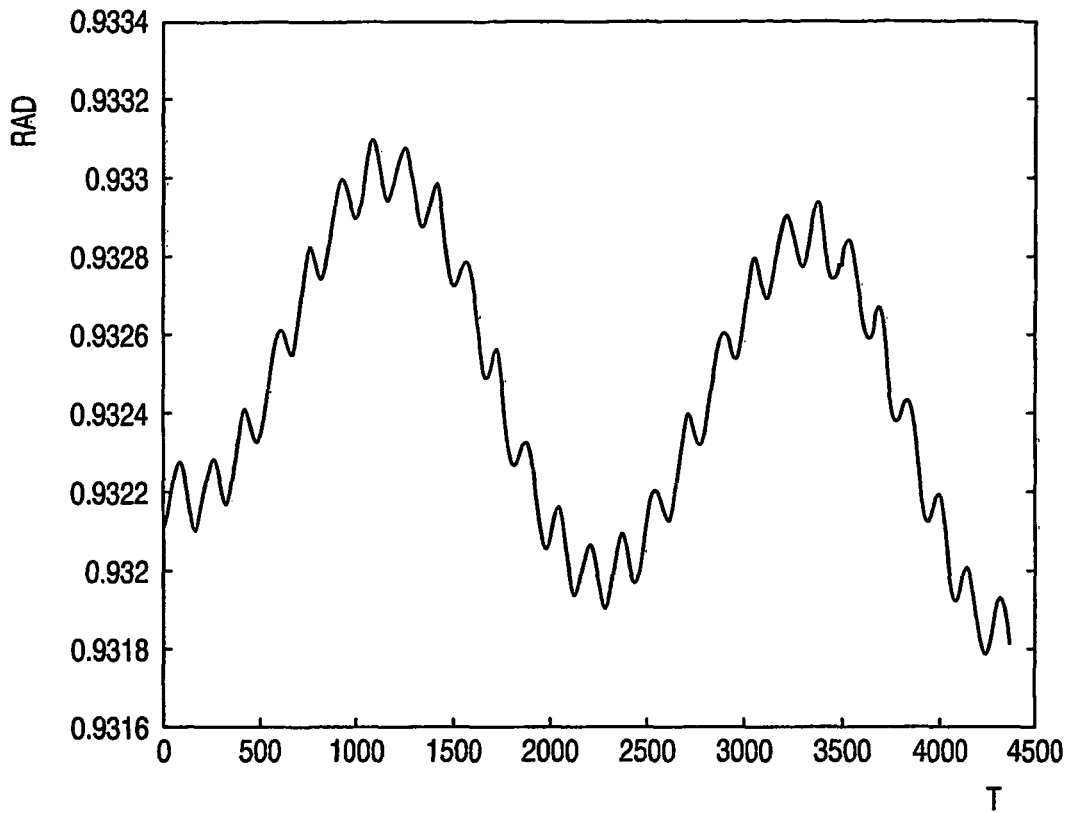
FIG. 4 shows the variation of a broadcast ephemeris parameter over time.

The inventors have discovered that the variation over time of each of the above parameters (P), with the exception of (2) eccentricity, can be readily modelled using the following equation:

$$P = C_1 + C_2 t + C_{sun} \cos(2\pi f_{sun} t + \phi_{sun}) + C_{moon} \cos(2\pi f_{moon} t + \phi_{moon})$$

where:
t is the time since the start of the year $$f_{sun} = \frac{1}{182.5 \text{ days}}$$

$$f_{moon} = \frac{1}{13.7 \text{ days}}$$

and $C_1$, $C_2$, $C_{sun}$, $C_{moon}$, $\phi_{sun}$ and $\phi_{moon}$ are constants which may be readily determined for each ephemeris parameter using only a small amount of past data. FIG. 4 shows the inclination angle in radians (RAD) measured in two hours intervals (T) for satellite 2 during 2002. The offset and drift (modelled by $C_1+C_2 t$ in the above equation) and the two periodic variations due to solar and lunar effects (modelled by $\cos(2\pi f_{sun} t+\phi_{sun})$ and $\cos(2\pi f_{moon} t+\phi_{moon})$) are apparent.

Hence, in accordance with the present invention, the supplemental ephemeris determined by the base station BS1 and provided to the mobile telephone MS1 comprises 14 sets of 6 constants, each set describing the variation over time of 14 of the 15 standard ephemeris parameters.

The variation of the orbit eccentricity can not necessarily be modelled with the above equation. Fortunately, however, it does not vary as much as some of the other standard ephemeris parameters to the extent that it remains valid comfortably beyond the 2 hours period in which standard ephemeris is generally considered valid. In any case, longer term variations of eccentricity may also be modelling by, for example, extrapolating first and second order variations or polynomial curve fitting. Parameters describing such variation can be determined by the base station BS1 and also transmitted to mobile telephone MS1.

Figure 5:
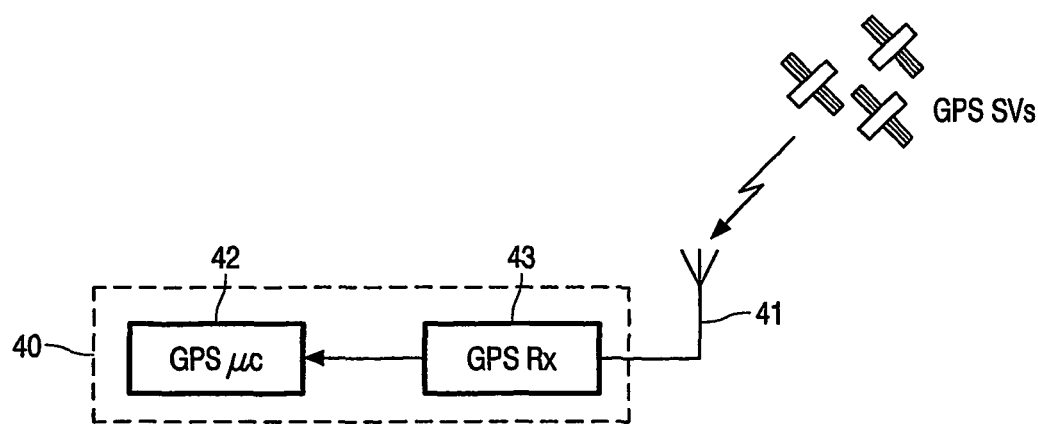
FIG. 5 shows a stand-alone GPS receiver operating in accordance with the present invention.

The aforementioned example concerns a server based A-GPS type solution, however, as mentioned above, given the simplified computation involved, it is possible to provide a GPS receiver which itself is able to determine supplemental GPS ephemeris from a history of standard GPS ephemeris received directly from the GPS satellites by that GPS receiver. Such a stand-alone GPS receiver is shown schematically in FIG. 5. When the receiver is able to receive GPS signals and derive ephemeris data directly therefrom (thereby acquiring a history of ephemeris), parameters described the variation of the ephemeris can be determined. Subsequently, perhaps when signal conditions are such pseudoranges can be measured from the GPS signals but the ephemeris data message on the GPS signals can not demodulated, old ephemeris data corrected by the supplemental ephemeris determined earlier can be used to provide accurate ephemeris and hence determine a position fix.

From a reading of the present disclosure, other modifications will be apparent to the skilled person skilled and may involve other features which are already known in the design, manufacture and use of GPS receivers and component parts thereof and which may be used instead of or in addition to features already described herein.

Finally, whilst the invention has been described in the context of NAVSTAR GPS, the all weather, spaced based navigation system developed and currently operated by the US Department of Defense, it will be appreciated that the invention may be equally applicable to other global positioning systems including GLONASS and Galileo and hybrids thereof.

The invention claimed is:

1. A method of determining a GPS position fix comprising the steps of:
   providing standard GPS ephemeris corresponding to that transmitted by a GPS satellite;
   generating supplemental GPS ephemeris at a GPS navigation device, the supplemental GPS ephemeris comprising at least one parameter describing the fluctuation over time of at least one satellite orbit parameter of the standard GPS ephemeris;
   measuring pseudoranges to GPS satellites; and
   determining a GPS position fix for the GPS navigation device from at least one of a plurality of data, the plurality of data comprising the standard and supplemental GPS ephemeris and the pseudoranges.

2. A method according to claim 1 wherein the supplemental GPS ephemeris includes at least one parameter describing a frequency component of the fluctuation over time of at least one satellite orbit parameter of standard GPS ephemeris.

3. A method according to claim 2 wherein the or at least one of the frequency components corresponds to a lunar cycle.

4. A method according to claim 2 wherein the or at least one of the frequency components corresponds to a solar cycle.

5. A GPS receiver configured to determine a GPS position fix from standard GPS ephemeris corresponding to that transmitted by a GPS satellite;
   supplemental GPS ephemeris including at least one parameter describing the fluctuation over time of at least one satellite orbit parameter of the standard GPS ephemeris; and
   pseudoranges measured from the GPS receiver to GPS satellites.

6. A GPS receiver according to claim 5 wherein the supplemental GPS ephemeris includes at least one parameter describing a frequency component of the fluctuation over time of at least one satellite orbit parameter of standard GPS ephemeris.

7. A GPS receiver according to claim 6 wherein the or at least one of the frequency components corresponds to a lunar cycle.

8. A GPS receiver according to claim 6 wherein the or at least one of the frequency components corresponds to a solar cycle.

9. A GPS receiver according to claim 5 further configured to determine at least one parameter of the supplemental GPS ephemeris from a history of standard GPS ephemeris received directly from the GPS satellites by the GPS receiver.

10. A server configured to transmit to a remote GPS receiver supplemental GPS ephemeris including at least one parameter describing the fluctuation over time of at least one satellite orbit parameter of standard GPS ephemeris corresponding to that transmitted by a GPS satellite, the supplemental ephemeris generated by an equation of the form:

$$P = C_1 + C_2 t + C_{sun}(\cos(2\pi f_{sun} t + \phi_{sun})) + C_{moon}(\cos(2\pi f_{moon} t + \phi_{moon}))$$

wherein P is a satellite orbit parameter, $C_1$, $C_2$, $C_{sun}$, $C_{moon}$, $\phi_{sun}$, and $\phi_{moon}$ are constants based on the standard GPS ephemeris, t is the time since the beginning of the year and:

$$f_{sun} = \frac{1}{182.5 \text{ days}}, \text{ and } f_{moon} = \frac{1}{13.7 \text{ days}}.$$

11. A server according to claim 10 wherein the supplemental GPS ephemeris includes at least one parameter describing a frequency component of the fluctuation over time of at least one satellite orbit parameter of standard GPS ephemeris.

12. A server according to claim 11 wherein the frequency component corresponds to a lunar monthly cycle.

13. A server according to claim 11 wherein the frequency component corresponds to a yearly cycle.

14. A method according to claim 1, wherein providing the supplemental GPS ephemeris at the GPS navigation device comprises implementing an equation of the form:

$$P = C_1 + C_2 t + C_{sun}(\cos(2\pi f_{sun} t + \phi_{sun})) + C_{moon}(\cos(2\pi f_{moon} t + \phi_{moon}))$$

wherein P is a satellite orbit parameter, $C_1$, $C_2$, $C_{sun}$, $C_{moon}$, $\phi_{sun}$, and $\phi_{moon}$ are constants based on the standard GPS ephemeris, t is the time since the beginning of the year and:

$$f_{sun} = \frac{1}{182.5 \text{ days}}, \text{ and } f_{moon} = \frac{1}{13.7 \text{ days}}.$$

15. A method according to claim 1, wherein providing the standard GPS ephemeris comprises transmitting the standard GPS ephemeris from the satellite directly to the GPS navigation device.

16. A server according to claim 10, wherein the remote GPS receiver is further configured to determine at least one parameter of the supplemental GPS ephemeris from a history of standard GPS ephemeris received directly from the GPS satellites by the remote GPS receiver.

17. A server according to claim 10, wherein the standard GPS ephemeris is transmitted from the satellite directly to the remote GPS receiver.

* * * * *